(12) United States Patent
Lautenschläger

(10) Patent No.: US 7,400,387 B2
(45) Date of Patent: Jul. 15, 2008

(54) METHOD FOR MONITORING AN OPTICAL TRANSMISSION LINE, CORRESPONDING MEASURING DEVICE AND OPTICAL TRANSMITTER

(75) Inventor: Wolfram Lautenschläger, Sachsenheim (DE)

(73) Assignee: ALCATEL, Paris (FR)

(*) Notice: Subject to any disclaimer, the term of this patent is extended or adjusted under 35 U.S.C. 154(b) by 0 days.

(21) Appl. No.: 11/485,454

(22) Filed: Jul. 13, 2006

(65) Prior Publication Data

US 2007/0036545 A1 Feb. 15, 2007

(30) Foreign Application Priority Data

Aug. 12, 2005 (EP) .................. 05291727

(51) Int. Cl.
*G01N 21/00* (2006.01)
(52) U.S. Cl. .................................... 356/73.1
(58) Field of Classification Search ........... None
See application file for complete search history.

(56) References Cited

U.S. PATENT DOCUMENTS 5,416,623 A 5/1995 Dawson
6,075,628 A 6/2000 Fisher
6,731,677 B1 * 5/2004 Hurst et al. .............. 375/216
6,882,662 B2 * 4/2005 Subrahmanyan et al. .... 370/506

FOREIGN PATENT DOCUMENTS

EP 0 560 426 A 9/1993
EP 1 524 781 A 4/2005

OTHER PUBLICATIONS

G. Biain et al, "New techinque for nonintrusive OTDR based on traffic data correclation", Electronics Ldtters, IEE Stevenage, GB, vol. 30, No. 17, Aug. 18, 1994, pp. 1443-1444, XP006000939.
Materials from Lecture: Messverfahren zur Charakterisierung von Lichtwellenleitern un-komponenten at the Symposium—Nachrichtenubertragung mit Lichtwellenleitern—Technische Akademie Esslingen, Oct. 18-20, 2000, Ostfildern-Nellingen (Germany).

* cited by examiner

*Primary Examiner*—Tu T Nguyen
(74) *Attorney, Agent, or Firm*—Sughrue Mion, PLLC

(57) ABSTRACT

The invention relates to a method for monitoring an optical transmission line of an optical data network, wherein light is sent into the optical transmission line at a line input, and backscattered light of said light is detected at said line input and analysed, wherein during normal operation of said optical network, burst mode optical signals carrying a digital payload are sent onto the optical transmission line at the line input, and the backscattered light of said burst mode optical signals is detected at said line input and analysed. The inventive method is simple and cost-effective.

8 Claims, 4 Drawing Sheets state of the art state of the art

METHOD FOR MONITORING AN OPTICAL TRANSMISSION LINE, CORRESPONDING MEASURING DEVICE AND OPTICAL TRANSMITTER

BACKGROUND OF THE INVENTION

The invention is based on a priority application EP 05291727.5 which is hereby incorporated by reference.

The invention relates to a method for monitoring an optical transmission line of an optical data network, wherein light is sent into the optical transmission line at a line input, and backscattered light of said light is detected at said line input and analysed. The invention further relates to a measuring device and an optical transmitter.

Such a method has been disclosed, for example, in a lecture of W. Bludau, "Messverfahren zur Charakterisierung von Lichtwellenleitern und-komponenten", at the Symposium "Nachrichtenubertragung mit Lichtwellenleitern", Technische Akademie Esslingen, Oct. 18-20, 2000, Ostfildern-Nellingen (Germany).

Optical networks are used to transfer digital data. For this purpose, an optical network requires fully functional optical transmission lines. Therefore, the optical transmission lines need to be checked, in particular upon installation and in case of problems with the data transfer on a particular transmission line.

A method to check the state of an optical transmission line is optical time domain reflectometry (OTDR), as disclosed in the lecture of W. Bludau, see above. Short test pulses of light are sent into an optical fiber in order to activate Rayleigh back scattering within the optical fiber. The backscattered light is detected. A plot over time of the backscattered light is, when the optical fiber is fully functional, an exponentially declining curve. In case of defects within the optical fiber, abrupt changes are registered within the curve. The time delay between the illumination at the fiber input and the registry of back-scattered light indicates the position within the fiber where a problematic scattering event has taken place. In order to check the state of a fiber with this known method, it is necessary to interrupt the data transfer service, in particular for sending the short test pulses, and to reconfigure fiber connections manually; this makes this method cumbersome and expensive.

In a modified OTDR method, a sine wave modulation is done on top of a continuous data modulation (=super modulation), and the complex frequency characteristics of the backscattered channel are measured, followed by an inverse Fourier transformation. Thus the required impulse response is obtained. This modified method uses an operational data channel, but it reduces the extinction ratio of the data modulation. Further, it requires a linear operation of the modulator and its driver. Linear operating drivers and modulators are rather expensive compared to usual optical data transmitters which use nonlinear, on/off modulation techniques.

SUMMARY OF THE INVENTION

It is therefore the object of the invention to provide a method for monitoring an optical transmission line, which is simple and cost-effective.

This object is achieved, in accordance with the invention, by a method for monitoring an optical transmission line of an optical data network, wherein light is sent into the optical transmission line at a line input, and backscattered light of said light is detected at said line input and analysed, and wherein during normal operation of said optical network, burst mode optical signals carrying a digital payload are sent onto the optical transmission line at the line input, and the backscattered light of said burst mode optical signals is detected at said line input and analysed.

During the analysis, the original input signal, preferably still in its digital state, and the backscattered signal are correlated. In accordance with the invention, channel estimation techniques known from telephony and modem designs are used to estimate the back scatter channel. These techniques are applicable since the back scatter channel is sufficiently stationary, and since the input signal contains the relevant spectral components; this latter requirement is fulfilled with asynchronous optical burst mode transmission without any additional modulation.

By this means, monitoring of an optical transmission line is possible, realizing a number of advantages:

Automatic remote in-service monitoring: In contrast to classical OTDR, the invention is applicable during normal operation of the optical network. Neither a service interruption for measurement, nor manual plugging of equipment is required.

Bypass add-on to approved transmitter technology: In contrast to other in-service measurement techniques, the invention does not require any modification to the transmitter signal path. Applicable to optical burst mode: The invention uses the optical burst mode (varieties of PON), which allows the use of inexpensive and widely used equipment. In contrast, the known super modulation method is not applicable to optical burst mode.

In a preferred variant of the inventive method, the burst mode optical signals and the backscattered burst mode optical signals are correlated to estimate channel parameters by means of Fourier/inverse Fourier transformation, and/or auto and cross correlation analysis, and/or adaptive digital filtering. These channel parameter estimation techniques are proved and tested in practice. Note that in accordance with the invention, for the analysis, the original signal may still be in a digital payload data state, i.e. before having been fed to a driver unit and a laser/modulator unit, for correlation with the backscattered burst mode optical signal. The latter is independent of the used channel parameter estimation technique.

A highly preferred variant of the inventive method is characterized in that the burst mode optical signals and the backscattered burst mode optical signals are correlated to estimate channel parameters by means of adaptive digital filtering, and that for means of analysis, the digital payload signal is band limited and down sampled to a required spectral range, the resulting signal is then filtered by an adaptive finite impulse response (=FIR) filter acting as a channel model, the output of said channel model is then compared to the output of the real back scatter channel, the resulting error signal is fed to an adaptation algorithm that adjusts filter coefficients in a way that minimizes the average quadratic error, and after convergence of the algorithm, the filter coefficients are read out to provide an optical time domain reflectometry (=OTDR) plot. This variant details an adaptive digital filtering that can easily be carried out with inexpensive equipment. The required spectral range depends on the optical transmission line that is to be monitored. The first, lower frequency limit indicates the length that can be monitored, wherein a longer length requires a smaller lower frequency limit. The second, upper frequency limit indicates the spatial resolution of the monitoring, wherein a higher spatial resolution requires a higher upper frequency limit. The spatial resolution is typically chosen according to the demands of a maintenance staff in the field.

In a further development of said variant, the required spectral range comprises the range of 5 kHz to 5 MHz. This corresponds, assuming a typical speed of light of $\frac{2}{3}c_0$ ($c_0$: speed of light in vacuum) within the optical transmission line, to a monitored total length of about 20 km, and a spatial resolution of 10 m. These are values useful in practice to find fiber problems in existing optical networks quickly and with acceptable effort.

Also within the scope of the invention is a measuring device comprising means for performing the steps of the above described inventive method. Such a measuring device can simply be added to an existing optical transmitter. Basically, the measuring device requires access to the digital payload which may be achieved without any analogous equipment, but just with an additional tap of an electric line, and it requires a possibility to measure the backscattered light at the line input of the optical transmission line. The transmitter signal path remains unaffected upon installation of the inventive measuring device. The measuring device comprises typically a beam splitter, a low speed photo receiver, an A/D conversion unit, and a processing device providing an OTDR plot or corresponding data, respectively.

Further within the scope of the invention is an optical transmitter comprising an above described inventive measuring device. The optical transmission line, into which the optical transmitter emits its light, can be monitored constantly.

A preferred embodiment of the inventive optical transmitter is characterized in that a digital payload data input is directly connected to (and providing digital payload data to) a processing device and a driver unit, the driver unit is connected to a laser/modulator unit, the laser/modulator unit feeds light through a beam splitter into a line input of an optical transmission line, the beam splitter reflects backscattered light coming from the line input of the optical transmission line onto a low speed photo receiver, the low speed photo receiver is connected to an A/D conversion unit, the A/D conversion unit is connected to the processing device, and the processing device has an output for providing an optical time domain reflectometry (=OTDR) plot.

This embodiment is simple and inexpensive.

In a further development of this embodiment, the driver unit and the laser/modulator unit are designed such that they generate burst mode optical signals.

Further advantages can be extracted from the description and the enclosed drawing. The features mentioned above and below can be used in accordance with the invention either individually or collectively in any combination. The embodiments mentioned are not to be understood as exhaustive enumeration but rather have exemplary character for the description of the invention.

Figure 1:
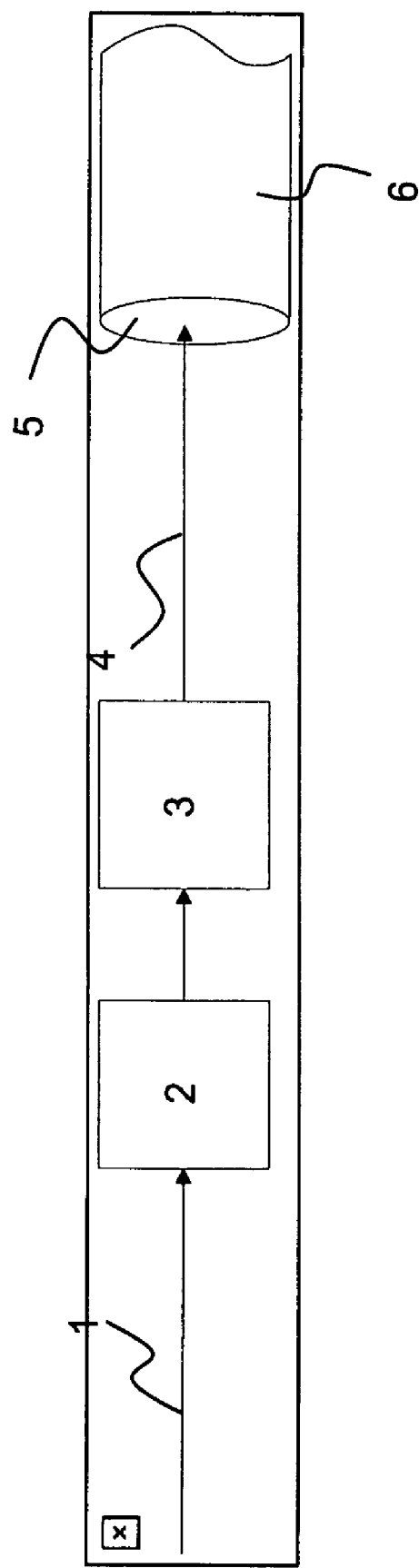
FIG. 1 shows a schematic diagram of an optical transmitter without fiber monitoring of the state of the art.

Fiber monitoring by use of the Rayleigh scattering is a well known technique to estimate the health of a field installed optical fiber. The basic idea is as follows: In a given section of fiber some fraction of the incoming light gets lost by scattering, and part of the scattered light is traveling back to the initial fiber input. The back-scattered light can be measured at the fiber input. Unfortunately it is of low evidence as it is the superposition of contributions from all (infinitesimal small) sections of the fiber. To get a measure for particular fiber sections, the fiber can be feed with short pulses. The pulse travels at constant speed along the fiber. It enlightens at any time only a short section of the fiber. The back-scattered light undergoes the same delay and the same attenuation as the pulse did, when it comes back to fiber input. Thus, the plot over time of the back-scattered light gives a measure of the light power distribution across the fiber. It can be shown, that for an homogenous fiber the plot is an exponential curve with constant decay, or in a logarithmic plot—a straight line. Abrupt changes of decline indicate potential problems in the fiber (strong bends, tension, etc.). The delay from beginning of the plot to the abnormality indicates the distance along the fiber to the location of the problem. The outlined method is known as Optical Time Domain Reflectometry (OTDR).

From a system theory perspective OTDR is nothing else than the measurement of the impulse response of the back scatter channel: We input a short pulse into the channel and measure the output signal (the backscattered light) over time. In consequence, all other known techniques for determination of unknown impulse responses can be applied for OTDR measurement, too. One of them is the measurement of the complex frequency characteristics of the back scatter channel followed by an inverse Fourier Transform. In this case the input signal is a sine wave modulated laser beam. For a series of equidistant frequencies both amplitude and phase of the modulation of the backscattered light needs to be determined. The inverse Fourier Transform of the measured series is the requested impulse response. The method has a number of pros and cons with respect to the original OTDR. One of the big advantages is that the measurement of a single frequency response sample is just the detection of a constant average level after coherent demodulation. This way disturbances by uncorrelated noise can be easily removed.

A further refinement comes into consideration, if the laser beam is not constant but a modulated optical channel. Optical channels use line coding and/or scrambling of the transmitted data bits. In this way the average optical power is constant even over relative short periods. Together with the above mentioned averaging of the frequency response method this can be used to simultaneously transmit data and measure the back-scatter channel. To do so the modulated data signal must be modulated on top by a sine wave with small extinction. For the data channel the sine wave super modulation is just a small reduction of the eye opening. For the back scatter channel the data modulation is a kind of noise, which can be suppressed by the averaging feature by the frequency response method as described above. The biggest advantage of this method is the fact, that it uses an operational data channel and not a special purpose test signal. However, the super modulation has also some fundamental drawbacks:

1. Both data and sine wave modulation share the same carrier—the light power. With a given modulator means none of both can use the full extinction, each one has to give up some room for the other one.
2. The superposition of two modulation signals requires linear operation of the modulator and its driver. This is a big difference (effort, cost) to usual optical data transmitters, where quite nonlinear, rather on/off modulation techniques are applicable.

Back Scatter Channel Estimation in Burst Mode

The present invention is based on the measurement principle as explained above but it avoids the need for an extra super modulation of the transmitter signal. This way modulator and driver circuitry remain exactly the same as for conventional transmitters that do not include fiber monitoring. Fiber monitoring becomes an none intrusive add-on to the normal transmitter.

The frequency response of the back scatter channel can be determined not only by dedicated sine wave modulated input signal but also by any other arbitrary input signal. In this case the frequency response of the channel is the complex quotient of the back scatter spectrum divided by the input spectrum. However, in terms of fault propagation it is required, that the input spectrum is sufficiently flat and different from zero in the relevant spectral range. It is not required, that the input spectrum is constant (stationary), as long as the detection period of input and output spectrum is identical.

The relevant spectral range can be roughly estimated as follows: The impulse response duration is twice the maximum fiber length divided by the propagation speed. The sampling period is given by the required fault localization accuracy. (e.g. 20 km fiber correspond to $(2*20 \text{ km})/(\frac{2}{3}*c_0)$ =200 µs impulse response duration, 10 m spatial resolution correspond to a sampling period of $(2*10 \text{ m})/(\frac{2}{3}*c_0)$=0.1 µs, in total the impulse response is roughly 2000 samples.) The upper frequency bound of the back scatter channel is, with respect to the sampling theorem, half the reciprocal sampling period. (In our example 5 MHz bandwidth with a frequency spacing of 5 kHz.)

Coming back to the question if the normal data modulation contains sufficiently large spectral components to determine the frequency response of the back scatter channel we see: Continuous data modulation in the Gbit/s range does not contain the relevant spectral components 5 kHz-5 MHz. This low frequency range is intentionally excluded from the spectrum by appropriate line coding and scrambling to avoid problems with AC coupled circuits. However, and this is the core of the present invention, an asynchronous optical burst-mode signal has, in contrast to continuous data signals, no lower band limit. It contains all frequencies down to DC. The signal spectrum is traffic dependent and non stationary. That means, not all spectral components will be present in each observation window, but it can be assumed that over a sufficiently long observation period all relevant frequencies will occur.

The spectrum of a base-band modulated digital signal can be calculated by knowledge of the transmitted data bits, with no regard of analog driver or modulator characteristics—this is true at least for the lower frequency parts we are talking about. For the back scatter channel estimation that means, we calculate the actual input spectrum from the transmitted data bits. There is no need to have neither a super modulation nor a linear driver/modulator chain nor an analog measurement of the actual input spectrum.

DETAILED DESCRIPTION OF THE DRAWINGS

The discussion above yields the necessary building blocks and the modus of operation. However, the outlined algorithm by use of Fast Fourier Transform (FFT) is not the only possible implementation. Adaptive filter designs have been widely used for channel estimation, too. For example echo cancellation in hands free telephony use adaptive channel models of the acoustical echo channel. Bi-directional modems use adaptive channel estimations to compensate the cooper cable cross talk. Adaptive filter designs use various methods for channel estimation. Main differences to the frequency domain solution above are—numeric and algorithmic complexity, convergence speed, robustness. Most of them are applicable to the back scatter channel estimation, too. Despite of all differences, all channel estimation methods have in common the spectral requirements to the input signal as discussed in the previous chapter. Independent of the implementation, the back scatter channel can be digitally calculated if the relevant spectral components occur in the data, which is the case for asynchronous optical burst mode but not for continuous modulation.

FIG. 1 shows an optical transmitter without fiber monitoring of the state of the art. A digital payload data signal 1 is fed into a driver unit 2, which drives a laser/modulator unit 3. A generated modulated laser beam 4 is fed into a line input 5 of an optical transmission line 6, i.e. an optical fiber.

Figure 2:
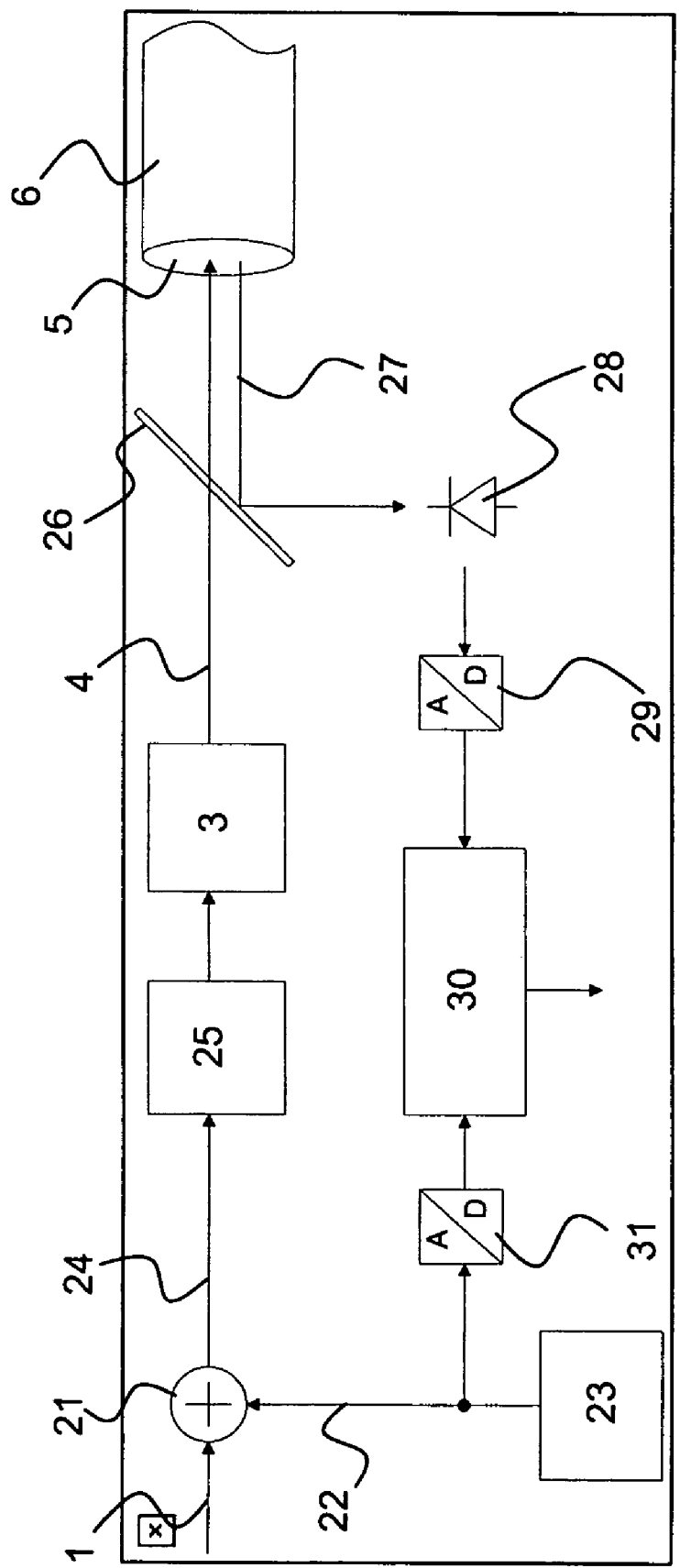
FIG. 2 shows a schematic diagram of an optical transmitter with a fiber monitoring of the state of the art using super modulation.

FIG. 2 shows a prior art optical transmitter with fiber monitoring based on super modulation. At modulation unit 21, an analogue sine wave signal 22 generated at a signal generator 23 is modulated onto the digital payload data signal 1. The resulting modulated signal 24 is fed into a linear driver unit 25. The linear driver unit 25 drives a laser/modulator unit 3, and its modulated laser beam 4 is fed into the line input 5 of the optical transmission line 6. The modulated laser beam 4 passes through a beam splitter 26 for this purpose. Backscattered light 27 emitted at the line input 5 of the optical transmission line 6 is reflected at the beam splitter 26 onto a low speed photo receiver 28. Its measured signal undergoes an analogue to digital conversion in an A/D conversion unit 29 and is fed into a processing device 30. The processing device 30 also receives the sine wave signal 22 after a A/D conversion in another A/D conversion unit 31. In the processing device 30, a correlation of the two signals received there is performed to generate a OTDR plot.

In summary of FIG. 2, a test signal (i.e. the sine wave signal) is modulated on top of the data signal. A beam splitter separates the backscattered light form the transmitted light. The OTDR plot can be calculated from the test signal and the backscattered light by means of Fourier/Inverse Fourier Transform.

Figure 3:
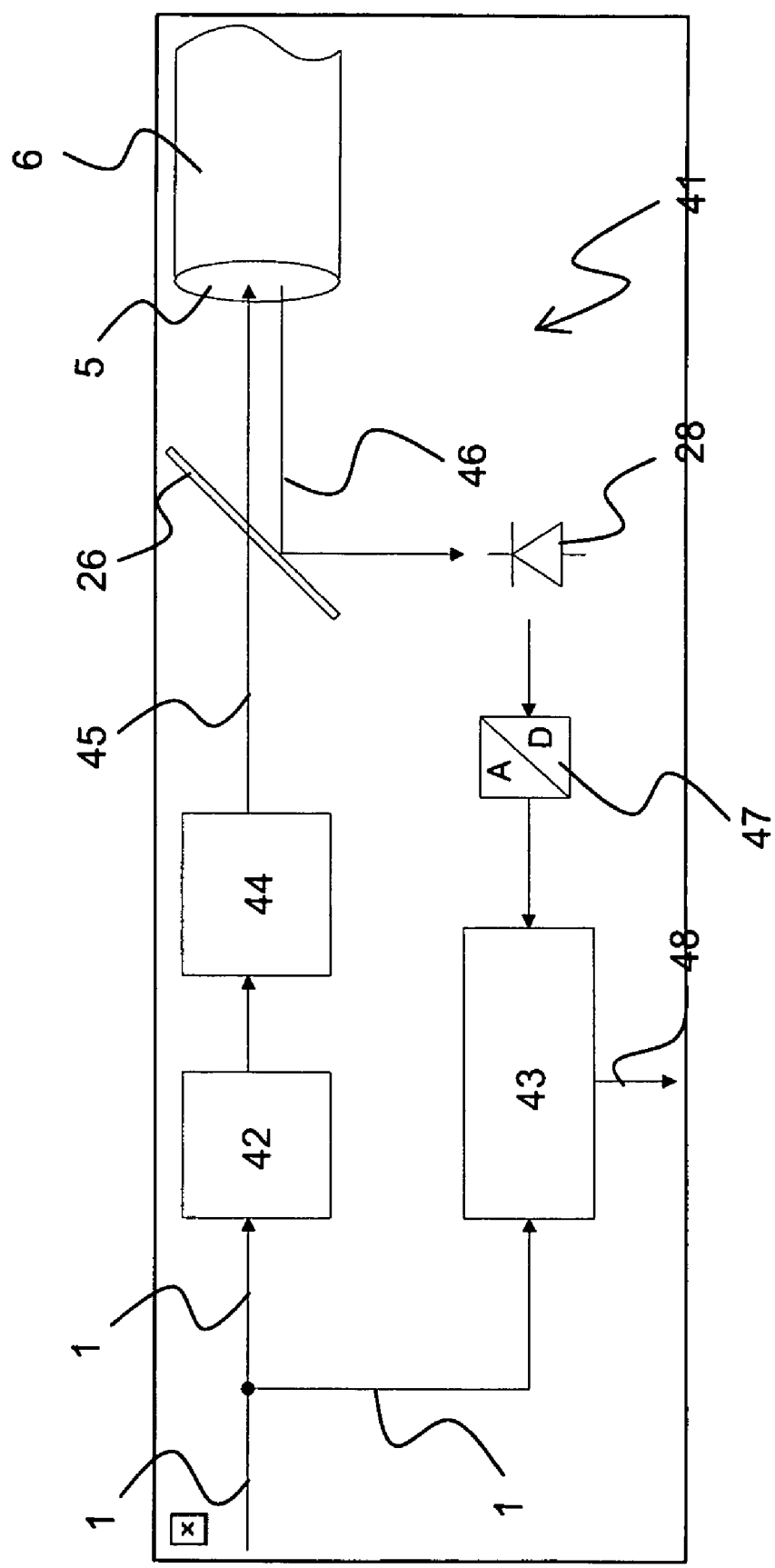
FIG. 3 shows a schematic diagram of an optical transmitter with a fiber monitoring in accordance with the invention using burst mode optical signals.

FIG. 3 shows an optical burst mode transmitter 41 with fiber monitoring in accordance with the invention. A digital payload data signal 1, provided at a digital payload data input (not shown), is fed directly both into a driver unit 42 and a processing device 43. The driver unit 42 drives a laser/modulator unit 44, wherein the driver unit 42 and the laser/modulator unit 44 together generate a burst mode optical signal 45. It passes through a beam splitter 26 and enters a line input 5 of an optical transmission line 6. Some of this light is scattered back, and the backscattered light 46 of the burst mode optical signal 45 is reflected at the beam splitter 26 and fed into a low speed photo receiver 28. Its signal is converted into a digital signal at a A/D conversion unit 47, and fed into the processing device 43. At the processing device 43, the OTDR plot is generated and made available at an output 48.

In summary of FIG. 3, no artificial test signal is required. The burst mode optical signal contains sufficient spectral components to calculate the OTDR plot. Due to the on/off keying of the digital signal the low frequency components do not suffer from nonlinearities in the driver modulator chain.

The processing device can calculate the OTDR plot by any channel estimation technique: Fourier/inverse Fourier transform, auto and cross correlation analysis, adaptive digital filter.

Figure 4:
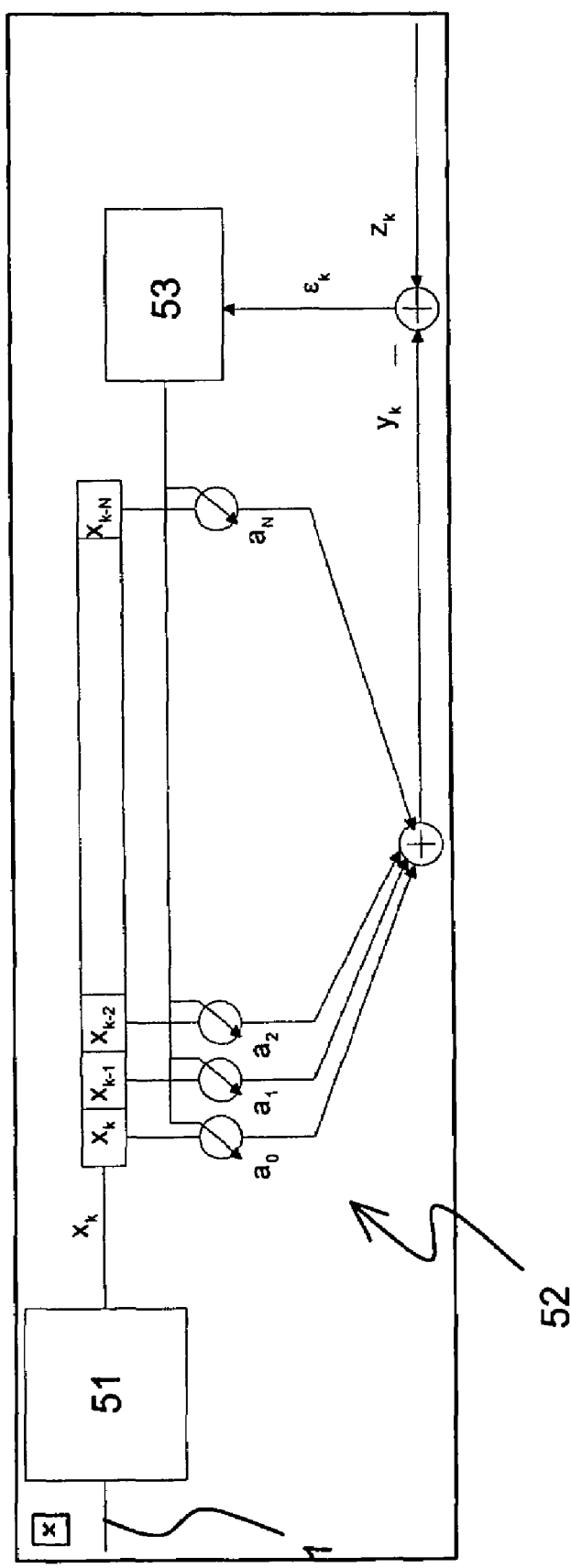
FIG. 4 shows an implementation example of a processing device for use within an inventive optical transmitter.

In FIG. 4, an implementation example of the processing device by adaptive digital filtering is given. The adaptive filter theory is well known. The example is given here for completeness only.

First the digital payload signal 1 is band limited and down sampled to the required spectral range at a low pass and decimation device 51. The resulting signal x is then filtered by an adaptive FIR (finite impulse response) filter 52 that acts as the channel model. The output of the channel model y is then compared to the output of the real back scatter channel z. The resulting error signal ϵ is fed to the adaptation algorithm 53 that adjusts the filter coefficients $a_1$-$a_N$ in a way that minimizes the average quadratic error ($E[\epsilon^2]$->min). The filtering function for the estimated channel output y in time step k is:

$$y_k = \sum_{i=0}^{N} a_i x_{k-i}$$

The adaptation algorithm of the coefficients $a_i$ is:

$$a_i^{k+1} = a_i^k + \gamma \cdot x_{k-i} \cdot (z_k - y_k)$$

where $a_i^k$ denotes the $i^{th}$ filter coefficient in time step k. γ is a small positive constant that controls the convergence speed and robustness of the algorithm.

After convergence of the algorithm the coefficients $a_0$-$a_N$ are the samples of the desired OTDR plot.

The invention claimed is:

1. A method for monitoring an optical transmission line of an optical data network, wherein light is sent into the optical transmission line at a line input, and backscattered light of said light is detected at said line input and analysed, and wherein during normal operation of said optical network, burst mode optical signals carrying a digital payload are sent onto the optical transmission line at the line input, and the backscattered light of said burst mode optical signals is detected at said line input and analysed.

2. The method according to claim 1, characterized in that the burst mode optical signals and the backscattered burst mode optical signals are correlated to estimate channel parameters by means of Fourier/inverse Fourier transformation, and/or auto and cross correlation analysis, and/or adaptive digital filtering.

3. The method according to claim 1, characterized in that the burst mode optical signals and the backscattered burst mode optical signals are correlated to estimate channel parameters by means of adaptive digital filtering, and that for means of analysis, the digital payload signal is band limited and down sampled to a required spectral range to generate a resulting signal, the resulting signal is then filtered by an adaptive finite impulse response filter acting as a channel model, the output of said channel model is then compared to the output of a real back scatter channel to generate a resulting error signal, the resulting error signal is fed to an adaptation algorithm that adjusts filter coefficients in a way that minimizes the average quadratic error of the filter coefficients, and after convergence of the algorithm, the filter coefficients are read out to provide an optical time domain reflectometry plot.

4. The method according to claim 3, characterized in that the required spectral range comprises the range of 5 kHz to 5 MHz.

5. A measuring device comprising means for performing the steps of the method defined in claim 1.

6. An optical transmitter comprising a measuring device according to claim 5.

7. The optical transmitter according to claim 6, characterized in that the digital payload is directly provided to a processing device and a driver unit, the driver unit is connected to a laser/modulator unit, the laser/modulator unit feeds light through a beam splitter into a line input of an optical transmission line, the beam splitter reflects backscattered light coming from the line input of the optical transmission line onto a low speed photo receiver, the low speed photo receiver is connected to a A/D conversion unit, the A/D conversion unit is connected to the processing device, and the processing device has an output for providing an optical time domain reflectometry plot.

8. The optical transmitter according to claim 7, characterized in that the driver unit and the laser/modulator unit are designed such that they generate the burst mode optical signals.

* * * * *